UNITED STATES PATENT OFFICE.

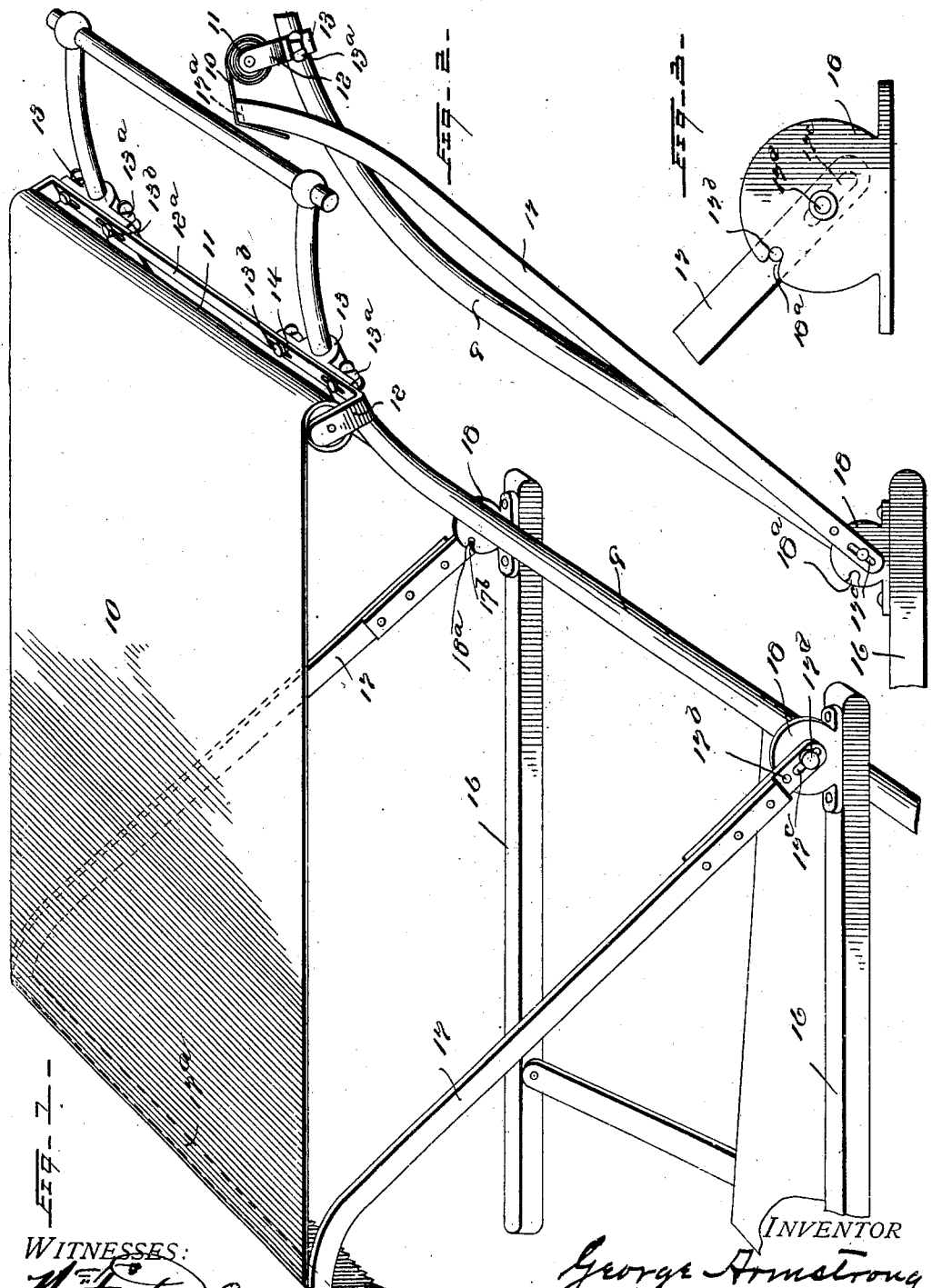

GEORGE ARMSTRONG, OF CHICAGO, ILLINOIS.

SHADE DEVICE FOR VEHICLES.

No. 826,915.

Specification of Letters Patent.

Patented July 24, 1906.

Application filed September 16, 1905. Serial No. 278,785.

*To all whom it may concern:*

Be it known that I, GEORGE ARMSTRONG, a citizen of the United States, residing at Chicago, in the county of Cook and State of Illinois, have invented new and useful Improvements in Shade Devices for Vehicles, of which the following is a specification.

My invention is a canopy or shade device for vehicles.

The device consists of an attachment, shown in the present instance as applied to a baby-carriage, in which the principal feature is a swinging or folding frame having arms which are pivoted to brackets at the side of the carriage, the top of the frame being fitted with a shade or canopy attached to a spring-actuated roller. This roller is mounted in a bracket which is adjustably attached to the carriage.

In the accompanying drawings, Figure 1 is a perspective view of the invention, so much only of the carriage being shown as will suffice to show the connection of the invention therewith. Fig. 2 is a side view showing the parts folded. Fig. 3 is a side elevation of one of the brackets to which the swinging frame is pivoted.

Referring specifically to the drawings, 10 denotes a shade or flexible canopy which is attached at its free end to a cross-arm $17^a$, connecting the two arms 17, said parts $17^a$ and 17 forming as a whole a U-shaped frame. The rear end of the shade is wound on a spring-roller 11, which is mounted in brackets 12, adapted to be attached to the side arms 9 of the handle of the carriage by adjustable clips 13. Said clips are secured by thumb-screws $13^a$, having bolts $13^b$, which extend through slots 14 in the cross-bar $12^a$, which connects the brackets. This construction permits adjustment of the attaching means according to the distance between the side arms 9.

The lower side bars of the carriage are indicated at 16, and on these are fastened brackets 18, on which the arms 17 are pivoted. The brackets 18 have each a notch $18^a$, and on each arm 17 is a pin $17^b$, adapted to enter said notch. The arms 17 are slotted, as at $17^c$, through which slots the pivot-bolts $17^d$ extend. By pulling the arms outwardly the pins $17^b$ can be disengaged from the notch $18^a$ and the arms 17 then swung rearwardly on their pivots $17^d$ to roll up the shade, as shown in Fig. 2. The shade is extended over the carriage by swinging the arms 17 forwardly, as shown in Fig. 1. In this position the pins $17^b$ engage the notches $18^a$, whereby the arms are held from swinging back to roll up the shade.

Having thus described my invention, what is claimed as new, and desired to be secured by Letters Patent, is—

1. A canopy device for vehicles comprising a bracket supported on the vehicle, a spring-roller mounted in said bracket and carrying a shade, and swinging arms pivoted on the vehicle-frame and connected to the free end of the shade.

2. The combination with a vehicle having rearwardly-extending handles, of a bracket secured to said handles, a spring-roller mounted in said bracket and carrying a shade, and vertically-swinging arms pivoted on the vehicle-frame and connected to the free end of the shade for extending the same over the vehicle.

3. The combination with a vehicle, of a spring-roller mounted thereon and carrying a shade, notched brackets secured to the vehicle-frame, vertically-swinging slotted arms secured to the free end of the shade and having projecting pins arranged to enter the notches in the aforesaid brackets, and pivot-bolts extending from the brackets through the slots in the arms.

In testimony whereof I have signed my name to this specification in the presence of two subscribing witnesses.

GEORGE ARMSTRONG.

Witnesses:
 CLARA PROSCHE,
 H. G. BATCHELOR.